United States Patent [19]
Jerde

[11] 3,905,394
[45] Sept. 16, 1975

[54] FLOW CONTROL SYSTEM
[75] Inventor: James B. Jerde, Alameda, Calif.
[73] Assignee: Digital Dynamics, Inc., Sunnyvale, Calif.
[22] Filed: Apr. 12, 1974
[21] Appl. No.: 460,350

[52] U.S. Cl. .................................. 137/599; 431/89
[51] Int. Cl.² ......................................... F16K 19/00
[58] Field of Search ................ 137/599; 431/89, 12

[56] References Cited
UNITED STATES PATENTS

| | | | |
|---|---|---|---|
| 3,067,761 | 12/1962 | Absalum | 137/599 X |
| 3,375,845 | 4/1968 | Behm | 137/599 X |
| 3,749,546 | 7/1973 | Reed et al. | 431/89 X |
| 3,827,457 | 8/1974 | Vutz et al. | 137/599 |
| 3,830,256 | 8/1974 | Cox | 137/599 |

*Primary Examiner*—Edward G. Favors
*Attorney, Agent, or Firm*—Lothrop & West

[57] ABSTRACT

A flow control system for gases such as LPG gas, includes a gas nozzle supplied from a source of gas under pressure through at least a first conduit and a second conduit. Each conduit has therein an individual flow control valve and a restricted orifice. The area for flow of the orifice in the first conduit is such that under the pressure available, there is a fixed mass flow therethrough, usually above sonic velocity and the flow control orifice in the second conduit is of an area likewise affording a fixed mass flow therethrough, usually above sonic velocity, under the pressure available and preferably has an area having a predetermined ratio to the area of the orifice of the first conduit; for example, a ratio of 2 to 1. There is a control for opening either one or both of the valves, as desired, to vary the total quantity of gas flow in the system. In usual practice, several conduits are utilized each with its individual valve and its individual orifice, the orifice sizes constituting a series in which the area ratio of one orifice to the one immediately below it is of about the predetermined valve.

5 Claims, 1 Drawing Figure

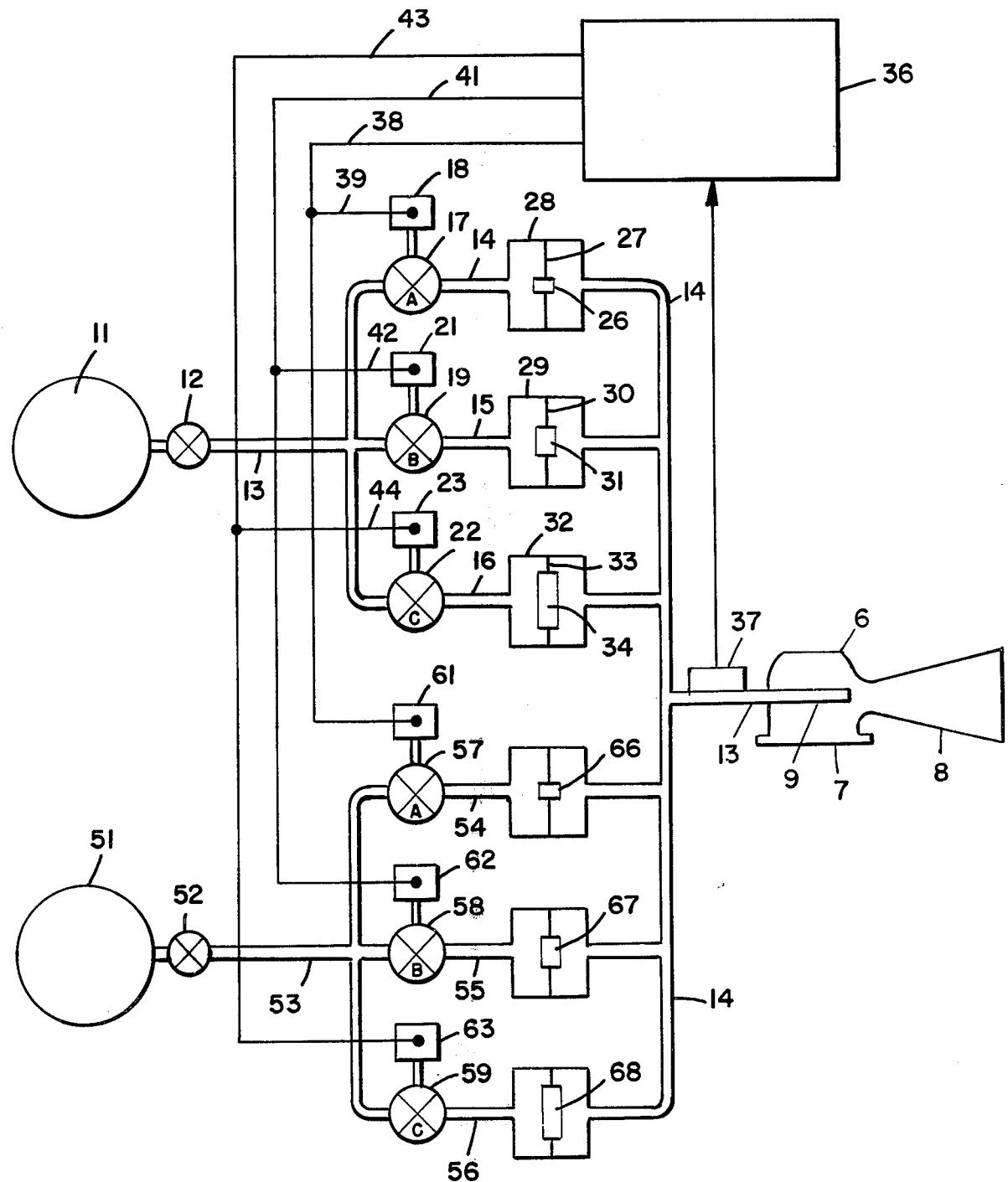

FLOW CONTROL SYSTEM

BACKGROUND OF THE INVENTION

There is an increasing need for improved mixing of gases for industrial use as, for example, the mixing of gases prior to combustion to result in the conservation of fuel. It is advisable to adopt means for effectively mixing gases for example in chemical environments as well as for improving the burning of gases. Particularly with liquid petroleum gas, usually referred to as LPG, there is not always close control over mixing and the resulting combustion. There are often substantial variations in flow of gas with respect to the admix of air for various purposes, especially combustion. The gas flow can vary from time to time in ways either very difficult to control or subject to random variations such as by temperature fluctuations and the like.

It is therefore an object of the invention to provide a flow control system that is effective to afford good gas mixing by providing accurate control of the supply of gas to the mixer.

A further object of the invention is to provide a flow control system which is effective to afford varying amounts of gas to a burner and to do so in a carefully controlled way so that the burner has a wide range of burning capacity.

Another object of the invention is to provide a flow control system utilizing readily available units of a generally reliable and simple nature.

A further object of the invention is to provide a flow control system affording a wide range of mixer or burner operation but with excellent mixing or combustion characteristics at all parts of the range.

A further object of the invention is in general to provide an improved gas flow control system.

Other objects, together with the foregoing, are attained in the embodiment of the invention described in the accompanying description and illustrated in the accompanying drawing, in which:

The FIGURE is a diagram, not to scale and with some parts exaggerated, showing a flow control system constructed pursuant to the invention and particularly effective for use with a single gas or with a plurality of gases.

In a preferred embodiment of the invention which has proved successful in practice, there is provided a mixer 6 including an air inlet 7 for atmospheric air and an outlet 8 for a gas mixture; for example, a combustible gas mixture. The mixer is supplied with gas by a nozzle 9 which ultimately derives gas, particularly liquid petroleum gas, from a first source 11 maintained under a substantially superatmospheric pressure. The source 11 is a tank which usually is provided with a main control valve 12 opening into a conduit 13 eventually joined to the nozzle 9. Between the valve 12 and the nozzle 9 the conduit separates into a plurality of branch ducts. For example, there is a first duct 14 in parallel with a second duct 15 and also in parallel with a third duct 16. The first duct 14 is provided with a flow control valve 17 actuated by a solenoid 18 whereas the second duct 15 has a control valve 19 operated by a solenoid 21 and the third duct 16 has a control valve 22 actuated by a solenoid 23.

In the first duct, there is a restricted orifice 26 formed in an orifice plate 27 in a compartment 28 in the duct 14. The orifice 26 has a carefully predetermined flow area or size so that when the valve 17 is fully open, the flow through the orifice 26 under influence of the pressure from the source 11 is fixed in mass per unit time. This usually occurs when the flow velocity through the orifice is at a sonic rate. Velocity at a sonic rate or the mass flow rate does not change under widely changing pressures. Pressure variation on the orifice 26, above a predetermined pressure, does not substantially change the quantity of flow therethrough in a unit time. The compartment 28 is connected by the remaining part of the duct 14 to the conduit 13 and so supplies the nozzle 9.

In a similar fashion there is disposed in the duct 15 a compartment 29 having an orifice plate 30 therein with an orifice 31 likewise effective under sufficient pressure drop to provide a fixed mass flow, or to afford a sonic velocity. In this instance, the flow area of the orifice 31 bears a predetermined ratio to the area of the orifice 26. Conveniently, this ratio is 2 to 1. The area for flow in the orifice 31 is twice that in the orifice 26.

In an entirely comparable fashion there is provided in the third duct 16 a compartment 32 in which is disposed an orifice plate 33 having an orifice 34 therein likewise effective under the pressure drop available to afford a fixed mass flow, or flow at a sonic velocity. Additional similar conduits, valves and orifice plates can be provided in parallel but the three illustrated show the nature of the invention.

Each of the orifice plates controls flow into the nozzle 13. To regulate the quantity of flow through such nozzle, there is provided a controller 36 preferably of an electrical nature and conveniently responsive to a sensor 37 responsive to flow through the nozzle to vary the quantity of gas supplied to the nozzle in accordance with requirements. The controller 36 is connected by a conductor 38 having a branch 39 going to the solenoid 18 for controlling the valve 17. A similar conductor 41 has a branch 42 going to the solenoid 21 for controlling the valve 19 and comparably there is a conductor 43 going from the controller to a branch 44 operating the solenoid 23 for governing the valve 22. While the controller 36, as illustrated, has feedback and is of the closed loop type, it has been found in practice that the present arrangement gives accurately reproducible results so that the sensor 37 can as well be a computer not responsive to nozzle flow but rather a programming device affording an open loop control.

In the operation of this much of the structure, when the valve 12 is opened and gas is permitted to flow from the source 11 toward the nozzle 9 there is no flow unless at least one of the valves 17, 19 or 22 is open. In accordance with the customary operation at least the solenoid 18 is energized and the valve 17 is opened. This is done abruptly by the solenoid so the valve is not a throttle but is either wide open or closed. The open valve affords a flow of one unit quantity of gas to the nozzle. This flow is remarkably constant despite variations in pressure drop above a minimum pressure drop because of the sonic nature of the flow resulting from the restriction afforded by the orifice 26. When additional output is required, additional valves are abruptly opened by actuation of the solenoids 21 and 23. As shown in the table below, the arrangement is preferably such as to produce a range of 7 to 1 in quantity by opening the valves 17 referred to as valve A and the valve 19 referred to as valve B and the valve 22 referred to as valve C, in a program as the table indicates.

TABLE

|   | Valve A | Valve B | Valve C |
|---|---------|---------|---------|
| 1 | Open    | Closed  | Closed  |
| 2 | Closed  | Open    | Closed  |
| 3 | Open    | Open    | Closed  |
| 4 | Closed  | Closed  | Open    |
| 5 | Open    | Closed  | Open    |
| 6 | Closed  | Open    | Open    |
| 7 | Open    | Open    | Open    |

Stated differently, when a small flow is required only valve A is open and valves B and C are closed. When more quantity is required, valve A is closed but valve B is open while valve C remains closed. This produces a set or predetermined jump in the amount of gas supplied by a factor of 2. That is, because of the relationship of orifice sizes the flow capacity is doubled. Similarly, as shown by the table, the capacity can go up by factors of 3, 4, 5, 6 and 7 by appropriate operation of the valves. Thus, while there is a large capacity for the burner, a range of 7 to 1, nevertheless there is an accurate flow at each step of the step by step variation. The flow is quite constant at each step so that the flow at any one condition is very precisely controlled. Thus, the utilization of gas in mixing is optimum and, in a burner, the use of fuel is on target.

Under some conditions, it is desired to operate the same nozzle 9 with an alternate gas or fuel or with a plurality of fuels. For that reason there is likewise provided a second source 51 of gas connected by a valve 52 to a second conduit 53 connected to the manifold 14 and thus eventually to the nozzle 9. The conduit 53 has branches just like the first conduit 13 and includes a first branch duct 54, a second branch duct 55 and a third branch duct 56. In each of the ducts are provided quick or snap-acting valves 57, 58 and 59 like the quick or snap-acting valves 17, 19 and 22 and themselves under the control of solenoids 61, 62 and 63. The solenoid 61 is connected in parallel with the solenoid 18 by the conductor 38 while the solenoid 62 is connected in parallel with the solenoid 21 by the conductor 41 and the solenoid 63 is connected in parallel with the solenoid 23 by the conductor 43.

Also, comparable to the provision of the orifice plates in the first conduit 13 there is a restricted orifice 66 in the duct 54, a restricted orifice 67 in the duct 55 and a restricted orifice 68 in the duct 56. The orifices 66, 67, 68 preferably bear the same ratio of areas to each other as do the orifices 26, 31 and 34, although area variations can be provided.

With this arrangement it is possible to operate the mixer, or burner, solely on an alternate gas from the source 51 by closing the main valve 12 and opening the main valve 52. In that instance, the controller 36 provides exactly the same step, wide range gas supply through the conduit 53, all at sonic velocity, as it does through the first conduit 13. On the other hand, if it is desired to operate on a mixture of two gases, then both of the main valves 12 and 52 are opened.

With this mechanism there is afforded an accurate, simple controller for a mixer, such as a burner, effective to permit mixer or burner operation over a relatively wide range and effective to provide step changes in the amount of gas supplied to the mixer or burner with a very accurate regulation of the amount of gas at each step of the total range. The series need not be limited to three valves in each group but can be extended say to four or more valves in each group with the same ratio of orifices and so on.

What is claimed is:

1. A flow control system comprising a gas nozzle, a source of gas under predetermined pressure, a first conduit connecting said source and said nozzle, a first flow control valve in said conduit, means including a first restricted orifice in said conduit, said orifice being of a size to produce gas flow therethrough, from said predetermined pressure, at or above sonic velocity whereby to insure a fixed rate of mass flow of said gas under said predetermined pressure, a second conduit connecting said source and said nozzle, a second flow control valve in said conduit, means including a second restricted orifice in said conduit, said second orifice being of a size to produce gas flow therethrough, from said predetermined pressure, at or above sonic velocity whereby to insure a fixed mass flow of said gas under said predetermined pressure, and means for selectively actuating said first valve and said second valve individually and together.

2. A system as in claim 1 including means for controlling said actuating means in response to pressure in said nozzle.

3. A system as in claim 1 in which said second orifice has an effective opening bearing a selected digital ratio to the effective opening of said first orifice.

4. A system as in claim 3 in which said ratio is 2 to 1.

5. A system as in claim 1 including at least one additional conduit connected between said source and said nozzle and provided with an additional flow control valve and with an additional restricted orifice, the effective area of said additional orifice bearing the same ratio to the area of said second orifice as the area of said second orifice bears to the area of said first orifice.

* * * * *